(12) United States Patent
Ouyang et al.

(10) Patent No.: US 12,093,014 B2
(45) Date of Patent: Sep. 17, 2024

(54) POSITION CALIBRATION SYSTEM AND METHOD

(71) Applicant: CHROMA ATE INC., Taoyuan (TW)

(72) Inventors: Chin-Yi Ouyang, Taoyuan (TW);
Wei-Cheng Kuo, Taoyuan (TW);
Chien-Ming Chen, Taoyuan (TW);
Xin-Yi Wu, Taoyuan (TW)

(73) Assignee: CHROMA ATE INC., Taoyuan (TW)

( * ) Notice: Subject to any disclaimer, the term of this patent is extended or adjusted under 35 U.S.C. 154(b) by 357 days.

(21) Appl. No.: 17/580,705

(22) Filed: Jan. 21, 2022

(65) Prior Publication Data

US 2023/0023844 A1 Jan. 26, 2023

(30) Foreign Application Priority Data

Jul. 23, 2021 (TW) ................................. 110127102

(51) Int. Cl.
*G05B 19/401* (2006.01)
*G01B 21/04* (2006.01)

(52) U.S. Cl.
CPC ......... *G05B 19/401* (2013.01); *G01B 21/042* (2013.01)

(58) Field of Classification Search
CPC ............................ G05B 19/401; G01B 21/042

USPC .......................................................... 702/95
See application file for complete search history.

(56) References Cited

U.S. PATENT DOCUMENTS

| | | | |
|---|---|---|---|
| 2006/0023938 A1* | 2/2006 | Ban ........................ | B25J 9/1692 382/153 |
| 2006/0180580 A1* | 8/2006 | Schramm ............ | B23K 26/0853 257/E23.179 |
| 2022/0254666 A1* | 8/2022 | Sadeghi ............ | H01L 21/68742 |

\* cited by examiner

*Primary Examiner* — Aditya S Bhat
(74) *Attorney, Agent, or Firm* — McClure, Qualey & Rodack, LLP

(57) ABSTRACT

A position calibration system and method are disclosed, in which a control unit is provided to control a positioner sensing module to scan a circular positioner provided on a positioning substrate in a first direction and a second direction so as to acquire midpoints of two scanned line segments and acquire an intersection of lines extending from the two center points in a direction perpendicular to the first and the second directions as a calibration reference point, which correspond to a centroid (a center) of the circular positioner. The calibration reference point functions as a reference point for positioning the positioning substrate with respect to the positioner sensing module and is stored in a memory unit. The calibration reference point can be used as a positioning point during installation of a machine and can also be used for calibration of a position of the machine.

9 Claims, 5 Drawing Sheets

POSITION CALIBRATION SYSTEM AND METHOD

CROSS-REFERENCE TO RELATED APPLICATION

This non-provisional application claims priority under 35 U.S.C. § 119(a) to patent application Ser. No. 11/012,7102 filed in Taiwan, R.O.C. on Jul. 23, 2021, the entire contents of which are hereby incorporated by reference.

BACKGROUND OF THE INVENTION

Field of the Invention

The present invention is related to a system and a method for position calibration of an electronic machine or processing equipment during installation.

DESCRIPTION OF THE RELATED ART

Positioning or calibration of various machines upon installation thereof is very important as it affects smoothness and accuracy of operation of the machines. Particularly, in the case that a plurality of components are to be arranged or assembled in a machine, the fact that these components of the machine are not precisely positioned or calibrated may cause the problem of the yield rate or failure of the machine.

Reference is made to FIG. 1, which is a schematic diagram showing the scenario of the present invention. Specifically, an electronic device testing apparatus as shown in FIG. 1 comprises a robotic arm 13 which transfers an electronic device IC to be tested from a feeding zone 10 to a testing zone 12 and then transfers the tested electronic device from the testing zone 12 to a discharging zone 11. When the electronic device testing apparatus is being installed, the robotic arm 13, the testing zone 12, the feeding zone 10 and the discharging zone 11 have to be positioned and calibrated so as to ensure that the robotic arm 13 can accurately pick up and place the electronic device when transferring the electronic device.

However, the conventional positioning and calibration methods are complicated. Typically, the position of each component is determined according to the standard size prescribed in an installation guide, or the component is mounted in a prescribed position marked on an apparatus. After the running test, the pick-and-place position of the robotic arm 13 or the installation position of the apparatus is repeatedly calibrated and finely adjusted. The conventional manner is very time-consuming and labor-intensive. As such, a simple, fast and automatic calibration system or method is highly expected in the industry.

SUMMARY OF THE INVENTION

One object of the present invention is to provide a position calibration system and a position calibration method capable of automatically calibrating the positions of different devices or machines and automatically compensating position deviation.

In order to achieve the foregoing object, the present invention provides a position calibration system, including a positioning substrate, a positioner sensing module, a memory unit and a control unit. At least one circular positioner is provided on an upper surface of the positioning substrate. The control unit is electrically connected to the positioner sensing module and the memory unit. The control unit controls the positioner sensing module to scan the circular positioner on the positioning substrate in a first direction and a second direction respectively so as to acquire an intersected center position of the circular positioner as a calibration reference point of the positioning substrate with respect to the positioner sensing module, and the calibration reference point is stored in the memory unit.

In other words, the position calibration system provided by the present invention uses a positioner sensing module to scan the circular positioner on the positioning substrate in at least two different directions, including the first and second directions respectively to acquire the centroid, i.e. the center, of the circular positioner as the calibration reference point. The calibration reference point can be used as a positioning point upon installation of a machine and can also be used for calibration of a position of the machine and for automatic compensation of position deviation.

The positioner sensing module of the position calibration system according to the present invention may include a robotic arm and a non-contact distance sensor unit. The non-contact distance sensor unit can be mounted on the robotic arm. The control unit controls the robotic arm to move in the first direction and the second direction, and the non-contact distance sensor unit scans the upper surface of the positioning substrate. The control unit records positions as the first initial position and the second initial position upon detecting a sudden rise of a surface height and records positions as the first terminal position and the second terminal position upon detecting a sudden drop of the surface height. In other words, the present invention can use the robotic arm to move the non-contact distance sensor unit for performing a scanning process and for calibration. The non-contact distance sensor unit is used to detect a sudden rise and a sudden drop in surface height of the circular positioner and record coordinates of positions. It is very convenient, fast and accurate.

The positioner sensing module of the position calibration system according to the present invention may also include a height measuring unit, which can be mounted on the robotic arm. The control unit controls at least one of the robotic arm and the height measuring unit to descend and records a current height value when the height measuring unit touches the upper surface of the positioning substrate. Accordingly, the present invention is not only suitable for calibrating and positioning an object in a coordinate system in a plane, but also the height measuring unit can be used to measure and calibrate a vertical position of the object.

In order to calibrate a deviation angle, a further circular positioner may be provided on the upper surface of the positioning substrate. The control unit may control the positioner sensing module to scan the further circular positioner on the positioning substrate in the first direction and the second direction respectively so as to acquire a further intersected center position of the further circular positioner. The control unit finds out a smaller one of an included angle between a virtual line segment connecting the intersected center position and the further intersected center position and an another virtual line segment extending in the first direction and an included angle between the virtual line segment connecting the intersected center position and the further intersected center position and the another virtual line segment extending in the second direction as an offset angle. According to the present invention, the deviation angle of the positioning substrate with respect to the first direction or the second direction can be determined based on the positions of the centers of the two circular positioners. The deviation angle refers to an orientation error of the actual orientation of the positioning substrate with respect to the moving direction of the robotic arm. Accordingly, the present invention is suitable for calibration of the position deviation and the angle deviation.

The present invention provides a position calibration method, which includes the steps of: providing a positioner sensing module, a positioning substrate and a control unit, a circular positioner being provided on an upper surface of the positioning substrate, the positioner sensing module being electrically connected to the control unit; controlling the positioner sensing module by means of the control unit to scan the positioning substrate in a first direction; recording a first initial position and a first terminal position upon detecting an edge of the circular positioner; by means of the control unit, acquiring a midpoint between the first initial position and the first terminal position in the first direction as a first midpoint position; controlling the positioner sensing module by means of the control unit to scan the positioning substrate in a second direction; recording a second initial position and a second terminal position upon detecting the edge of the circular positioner; by means of the control unit, acquiring a midpoint between the second initial position and the second terminal position in the second direction as a second midpoint position; by means of the control unit, acquiring an intersected center position of an extension line from the first midpoint position in a direction perpendicular to the first direction and an extension line from the second midpoint position in a direction perpendicular to the second direction as a calibration reference point of the positioning substrate with respect to the positioner sensing module.

According to the position calibration method provided by the present invention, the center of the circular positioner on the positioning substrate is used as the calibration reference point for calibration of a position of a machine. In the present invention, the circular positioner is scanned in at least two different directions, including the first and second directions, respectively so as to acquire midpoints of two scanned line segments and acquire an intersection of lines extending from the midpoints in a direction perpendicular to the first and the second directions respectively as a calibration reference point, which correspond to a centroid (a center) of the circular positioner. Accordingly, the present invention is capable of automatically, rapidly and accurately determining a coordinate of a specific point on the positioning substrate for positioning a machine upon installation thereof or for calibrating a position of a machine and is capable of automatically compensating the position deviation.

Preferably, according to the method of the present invention, in order to acquire the first midpoint position and the second midpoint position, the positioning substrate is scanned in a direction forwardly and backwardly at least once, and an intermediate value of a result of a forward scanning movement and a result of a backward scanning movement is acquired. As such, the signal delay is compensated, and an accurate measurement result can be obtained. Specifically, the control unit controls the positioner sensing module to scan the positioning substrate in the first direction forwardly and backwardly at least once. A first forward initial position and a first forward terminal position are recorded upon detecting an edge of the circular positioner in a forward scanning movement. A first backward initial position and a first backward terminal position are recorded upon detecting the edge of the circular positioner in a backward scanning movement. The control unit acquires a midpoint between the first forward initial position and the first forward terminal position in the first direction as a first forward midpoint position, and the control unit acquires a midpoint between the first backward initial position and the first backward terminal position in the first direction as a first backward midpoint position. The control unit acquires a midpoint between the first forward midpoint position and the first backward midpoint position in the first direction as the first midpoint position.

DESCRIPTION OF THE PREFERRED EMBODIMENTS

Figure 1:
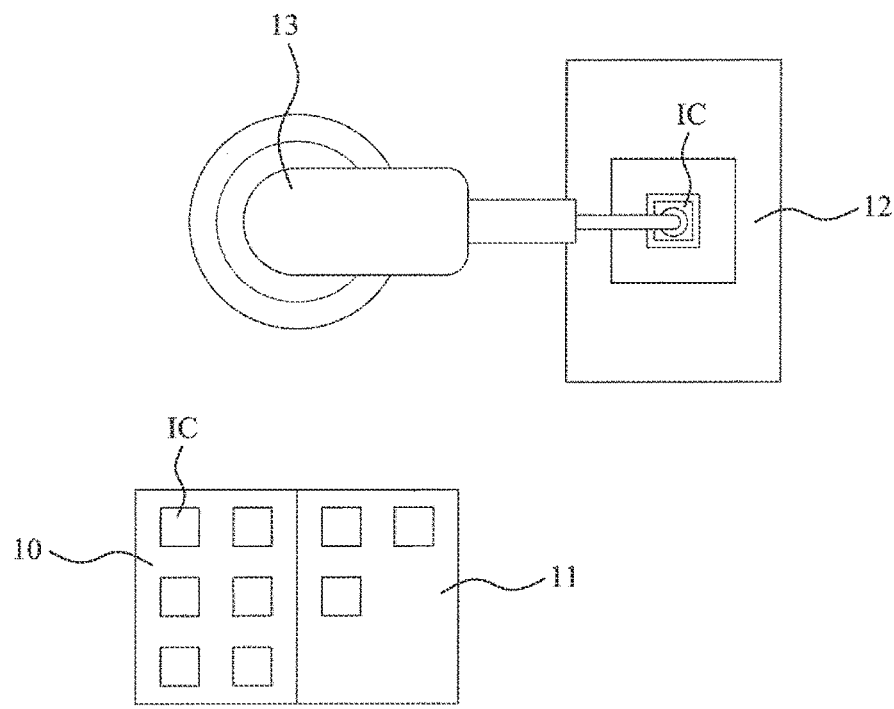
FIG. 1 is a schematic diagram showing a scenario in which the present invention is used.

Before the position calibration system and method of the present invention are described in detail, it should be particularly noted that in the following description, similar components will be designated by the same numeral reference. Furthermore, the drawings of the present invention are only for illustrative purposes and are not necessarily drawn to scale, and not all details are necessarily presented in the drawings.

Figure 2:
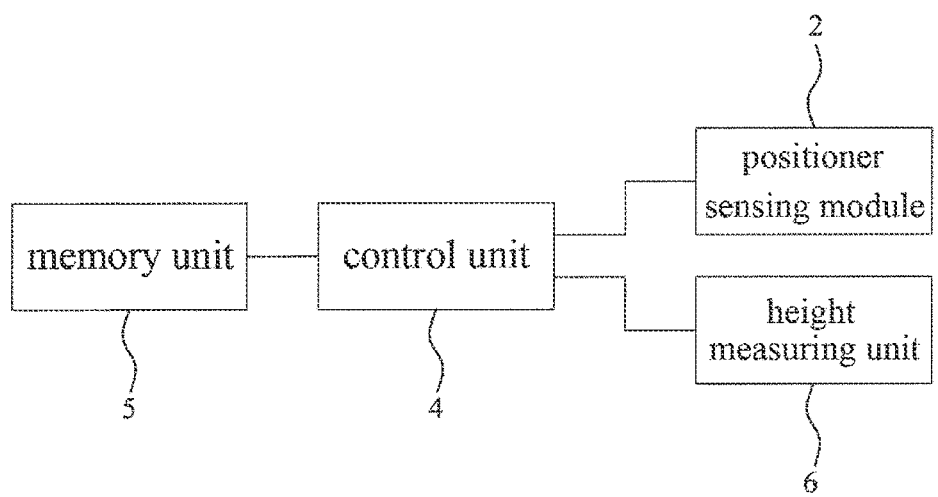
FIG. 2 is a block diagram according to a preferred embodiment of the present invention.
Figure 3:
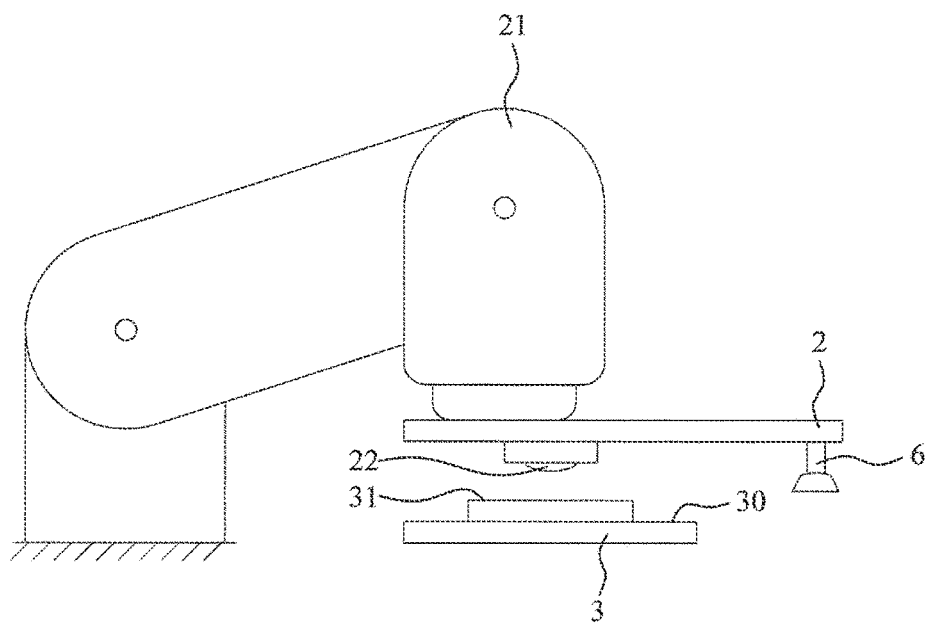
FIG. 3 is a schematic diagram showing the operation according to a preferred embodiment of the present invention.

Reference is made to FIG. 2 and FIG. 3, wherein FIG. 2 is a block diagram showing a preferred embodiment of the present invention, and FIG. 3 is a schematic diagram showing the operation according to the preferred embodiment of the present invention. As shown in the figures, the system in the embodiment mainly includes a positioning substrate 3, a positioner sensing module 2, a control unit 4, a memory unit 5 and a height measuring unit 6. The positioning substrate 3 is mounted on a machine to be calibrated. For example, in the scenario as shown in FIG. 1, the positioning substrate 3 may be mounted in the feeding zone 10, the discharging zone 11 or the testing zone 12.

The positioner sensing module 2 of the present embodiment includes a robotic arm 21 and a non-contact distance sensor unit 22. The non-contact distance sensor unit 22 and the height measuring unit 6 are mounted on the robotic arm 21. The non-contact distance sensor unit 22 (for example, a laser rangefinder capable of measuring a distance by means of a laser beam) emits laser pulses toward the object to be measured (i.e. the positioning substrate 3), and an elapsed time (time of flight) is counted from emission of the laser beam to reception of the reflected laser beam. The elapsed time can be converted into the distance between the non-contact distance sensor unit 22 and the positioning substrate 3. The non-contact distance sensor unit 22 of the embodiment is used for triggering recording of coordinates. Specifically, when the non-contact distance sensor unit 22 detects a significant change in the height of the surface of the positioning substrate 3, recording of the coordinate of the position is triggered.

Although the non-contact distance sensor unit 22 is embodied as a rangefinder in this embodiment, the positioner sensing module 2 of the present invention is not limited to the rangefinder. For example, the positioner sensing module 2 can be embodied as any suitable sensing mechanism capable of sensing the change (for example, color variation) on a surface of an object. The non-contact distance sensor unit 22 used in this embodiment is not limited to a laser rangefinder. Any suitable non-contact sensor capable of measuring the distance by using infrared, ultrasonic, imaging, radar and other ranging methods can be used in the present invention. The height measuring unit 6 of the embodiment is a contact sensor unit. A value of the height is recorded when the height measuring unit 6 touches the upper surface 30 of the positioning substrate 3. Similarly, the height measuring unit 6 of the present invention is not limited to the contact sensor unit. Any suitable non-contact sensor unit may be used as the height measuring unit in the present invention.

Figure 4A:
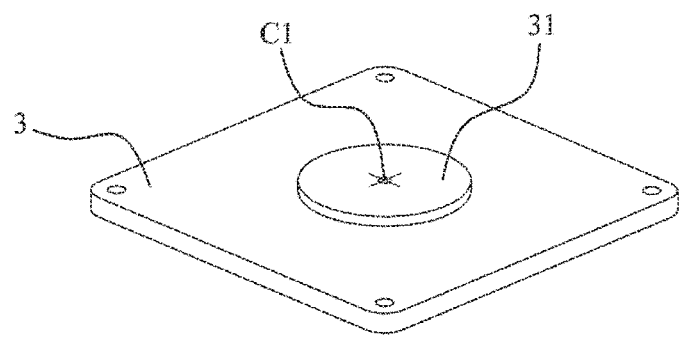
FIG. 4A is a perspective view of a positioning substrate according to a first embodiment of the present invention.

Reference is made to FIG. 4A, which is a perspective view of the positioning substrate 3 according to a first embodiment of the present invention. As shown in the figure, a circular positioner 31 (a circular protrusion) is provided on an upper surface 30 of the positioning substrate 3 of this embodiment. The control unit 4 of this embodiment can encompass all apparatus, device, and machines, and including by way of embodiment a programmable processor, a computer, or multiple processors or computers. The memory unit 5 of this embodiment can be a computer-readable medium suitable for storing computer program instructions and data, including, for example, a semiconductor memory such as EPROM, EEPROM and flash memory.

Figure 4B:
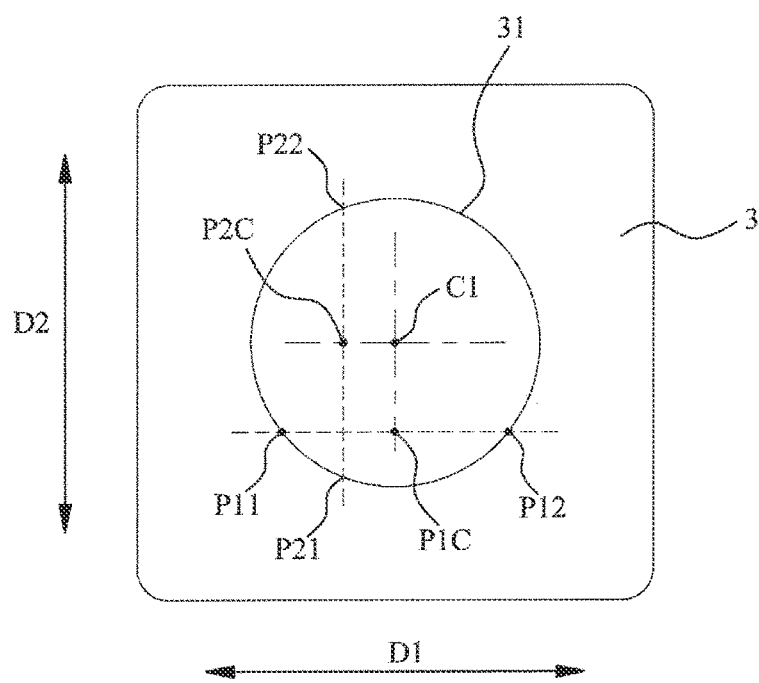
FIG. 4B is a schematic diagram showing acquirement of a calibration reference point according to a first embodiment of the present invention.
Figure 4C:
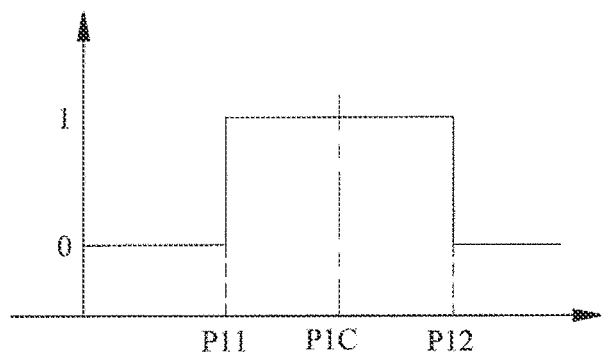
FIG. 4C is a graph showing a measurement signal for acquiring a first initial position and a first terminal position according to the first embodiment of the present invention.

The operation of the present embodiment will be described in the following description in detail. Reference is made to FIG. 4B, which is a schematic diagram showing acquirement of a calibration reference point C1 according to the first embodiment of present invention. Firstly, the control unit 4 controls the robotic arm 21 to move in the first direction D1 while the non-contact distance sensor unit scans the positioning substrate 3 along with the movement of the robotic arm 21. At the same time, the control unit 4 also records the coordinate position, to which the non-contact distance sensor unit 22 is directed, in real time along with the movement of the robotic arm 21. When a sudden rise of a surface height representing an edge of the circular positioner 31 is detected by the non-contact distance sensor unit 22, a voltage signal is triggered, as shown in FIG. 4C, and the control unit 4 records a coordinate position as a first initial position P11. Then, the robotic arm 21 keeps moving in the first direction D1. When a sudden drop of the surface height representing the edge of the circular positioner 31 is detected by the non-contact distance sensor unit 22, a further voltage signal is triggered, as shown in FIG. 4C, and the control unit 4 records a coordinate position as a first terminal position P12. In addition, the control unit 4 acquires a midpoint between the first initial position P11 and the first terminal position P12 in the first direction D1 as a first midpoint position P1C.

The control unit 4 controls the robotic arm 21 to move in the second direction D2 while the non-contact distance sensor unit 22 scans the positioning substrate 3 along with the movement of the robotic arm 21. When a sudden rise of the surface height representing the edge of the circular positioner 31 is detected by the non-contact distance sensor unit 22, a voltage signal is triggered, and the control unit 4 records a coordinate position as a second initial position P21. Then, the robotic arm 21 keeps moving in the second direction D2. When a sudden drop of the surface height representing the edge of the circular positioner 31 is detected by the non-contact distance sensor unit 22, a voltage signal is triggered, and the control unit 4 records a coordinate position as a second terminal position P22. In addition, the control unit 4 acquires a midpoint between the second initial position P21 and the second terminal position P22 in the second direction D2 as a second midpoint position P2C.

Next, the control unit 4 acquires an intersected center position C1 of an extension line from the first midpoint position P1C in a direction perpendicular to the first direction D1 and an extension line from the second midpoint position P2C in a direction perpendicular to the second direction D2. In other words, the position where an extension line from the first midpoint position P1C in a direction perpendicular to the first direction D1 and an extension line from the second midpoint position P2C in a direction perpendicular to the second direction D2 intersect is the centroid position (the center) of the circular positioner 31. Finally, the control unit 4 stores the coordinate of the intersected center position C1 in the memory unit 5, and the intersected center position C1 is used as a calibration reference point of the positioning substrate 3 with respect to the positioner sensing module 2.

More specifically, the calibration reference point can be used as a specific functional coordinate as required. For example, the calibration reference point can be used as a pick-and-place point coordinate, which is a coordinate of a position where the electronic component to be tested is picked up before being transferred or the electronic component is placed after being transferred. The calibration reference point can also be set as an origin position coordinate such that the control unit 4 can calculate coordinates of other pick-and-place positions. In other embodiments, such a calibration reference point can also be used as a positioning point for the installation of a machine.

In other embodiments, the calibration reference point can also be used for compensation of a position deviation. Specifically, the memory unit 5 can pre-store an origin position coordinate and a plurality of pick-and-place position coordinates. For example, the centroid position of a chip tray or the center of one of the chip slots on the shuttle can be pre-set as a reference point, and the centers of the chip slots on the chip tray or the centers of the other chip slots on the shuttle are pre-set as the plurality of pick-and-place coordinates. Actually, the calibration reference point is set corresponding to the origin position coordinate. For example, in the calibration stage, the positioning substrate 3 is mounted on the chip tray or a pre-set position on the shuttle so as to acquire the calibration reference point. Then, the positioning substrate 3 is replaced with a chip tray or a shuttle. Accordingly, the control unit 4 can calculate the deviation between the calibration reference point and the origin position coordinate and thus automatically compensate a position deviation for other pick-and-place position coordinates. In this manner, it can be ensured that the deviation compensated pick-and-place position coordinates are actual pick-and-place positions, and the position deviation of the pick-and-place positions resulting from the position deviation of the machine caused by installation can be calibrated.

It should be particularly noted that, in the foregoing embodiment, the non-contact distance sensor unit 22 is used to detect the circular protrusion, where the recording is triggered due to a significant height difference at the edge of the circular protrusion, and the present invention should not be limited to this. It is intended that the case that the boundary between the circular positioner 31 and the positioning substrate 3 can be identified based on a detectable significant surface difference between the circular positioner 31 and other parts of the positioning substrate 3 still falls within the scope of the present invention. For example, the circular positioner 31 itself may be a circular reflective sheet, or there is significant surface color difference or significant surface roughness difference between the circular positioner 31 and other parts of the positioning substrate 3. In general, it is intended that the case that the initial position and the terminal position of the circular positioner 31 can be detected during the process of scanning the positioning substrate 3 by the positioner sensing module 2 falls within the scope of the present invention.

In the present embodiment, in addition to acquiring the calibration reference point of the plane coordinates (based on the X-Y coordinate system), the height measuring unit 6 can also be used to measure the height of the upper surface 30 of the positioning substrate 3. In this embodiment, a contact sensor unit is used as the height measuring unit 6. The control unit 4 controls at least one of the robotic arm 21 and the height measuring unit 6 to slowly descend, and a voltage signal is triggered when the height measuring unit 6 touches the upper surface 30 of the positioning substrate 3. At that time, the control unit 4 records the current height value.

Figure 5A:
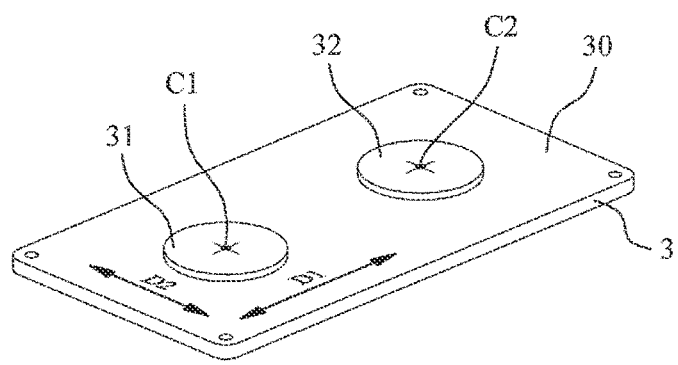
FIG. 5A is a perspective view of a positioning substrate according to a second embodiment of the present invention.
Figure 5B:
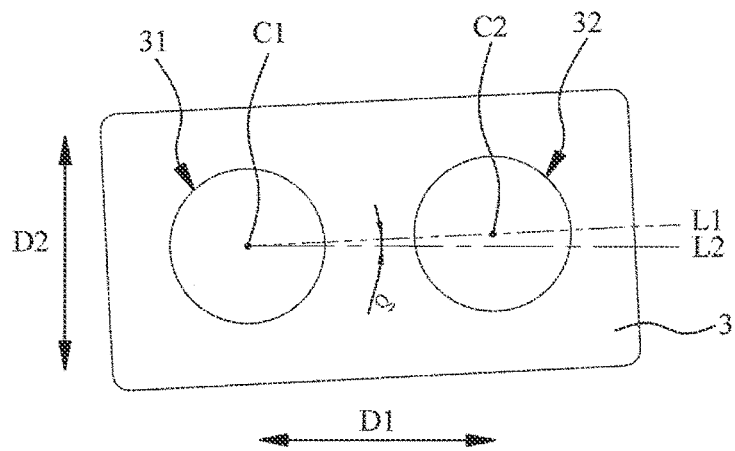
FIG. 5B is a schematic diagram showing acquirement of an offset angle according to the second embodiment of the present invention.

Reference is made to FIG. 5A and FIG. 5B, where FIG. 5A is a perspective view of a positioning substrate according to a second embodiment of the present invention and FIG. 5B is a schematic diagram showing acquirement of an offset angle according to a second embodiment of the present invention. During installation of the machine or device components, not only position deviation but also an angle deviation may occur. According to the present invention, such a problem can be easily solved. Specifically, in this embodiment, two circular positioners 31 and 32 are provided on the surface 30 of the positioning substrate 3. In this embodiment, the control unit 4 acquires intersected center positions C1 and C2 of the two circular positioners 31 and 32 according to the method provided in the foregoing embodiment. Then, the controller 4 calculates an included angle, as an offset angle δ, between a virtual line segment L1 connecting the two intersected center positions C1 and C2 and another virtual line segment L2 extending in the first direction D1 or the second direction D2. In this embodiment, the smaller included angle is regarded as the offset angle δ, which is the included angle between the virtual line segment L1 and the virtual line segment L2 extending in the first direction D1. However, such an offset angle δ is the deviation angle of the positioning substrate 3, which can be used for compensation of the angle deviation of the machine.

Figure 6:
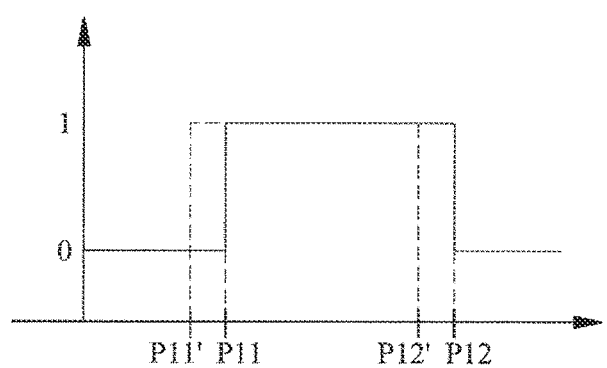
FIG. 6 is a schematic graph showing a measurement signal with a signal delay for acquiring a first initial position and a first terminal position.

Reference is made to FIG. 6, which is a schematic graph showing a measurement signal with a signal delay for acquiring a first initial position and a first terminal position. The signal delay will be further explained as follows. When the robotic arm 21 equipped with the non-contact distance sensor unit 22 moves, the control unit 4 records the coordinates in real-time along with the movement of the robotic arm 21 while receiving the trigger signal from the non-contact distance sensor unit 22. However, the transmission of the trigger signal for measurement of the surface height would inevitably cause a delay (time lag) between the recording of coordinates and the trigger signal. As shown in FIG. 6, assuming that P11' is the actual coordinate of the first initial position, the measured coordinate of the first initial position denoted by P11 in FIG. 6 slightly falls behind the actual coordinate of the first initial position in the traveling direction due to a signal delay. This results in a position deviation between the actual coordinate and the measured coordinate. Similarly, a delay would be caused upon the measurement of the terminal position. For example, P12' is the actual coordinate of the first terminal position, but the measured coordinate of the first terminal position denoted by P12 slightly falls behind the actual coordinate of the first terminal position in the traveling direction due to the signal delay.

Figure 7A:
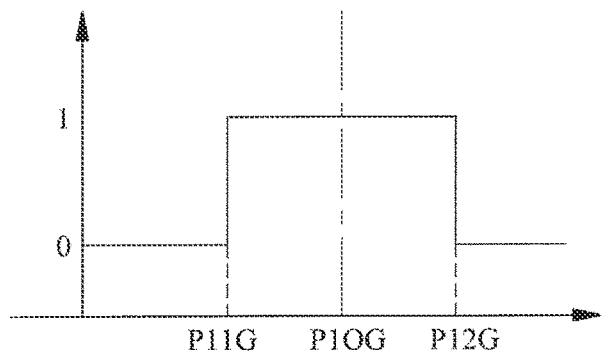
FIG. 7A, FIG. 7B and FIG. 7C are graphs showing measurement signals for acquiring a first midpoint position according to a third embodiment of the present invention.
Figure 7B:
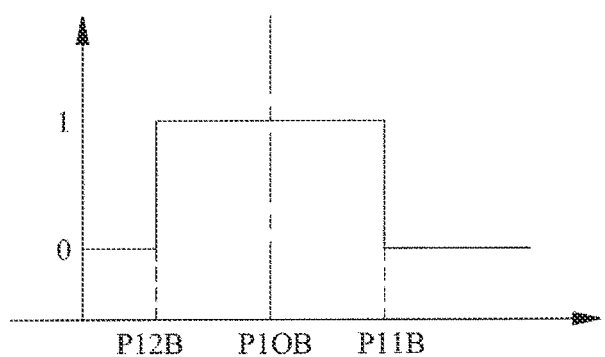
Figure 7C:
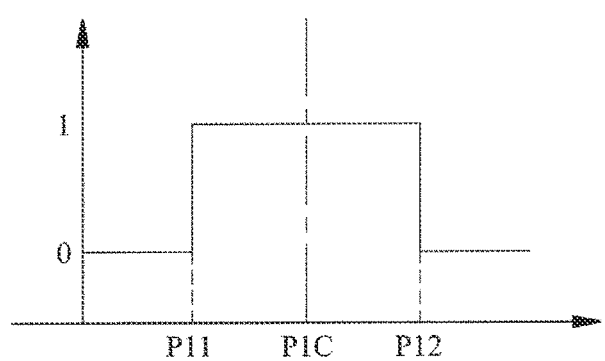

In order to solve the problem of the signal delay, in the present embodiment, the positioning substrate is scanned reciprocatingly for acquiring the first midpoint position P1C and the second midpoint position P2C, and an intermediate value of the first midpoint position P1C and the second midpoint position P2C is calculated. As such, the signal delay can be compensated to achieve accurate measurement results. Reference is made to FIG. 7A, FIG. 7B and FIG. 7C, which are schematic graphs showing acquirement of a first midpoint position according to a third embodiment of the present invention. The control unit 4 controls the positioner sensing module 2 to scan the positioning substrate 3 forwardly and backwardly in the first direction D1 once for acquiring the first midpoint position PIC.

When the edge of the circular positioner 31 is detected by the positioner sensing module 2 in a forward movement based on the surface height variation, a first forward initial position P11G and a first forward terminal position P12G are recorded, as shown in FIG. 7A. When the edge of the circular positioner 31 is detected by the positioner sensing module 2 in a backward movement based on the surface height variation, a first backward initial position P11B and a first backward terminal position P12B are recorded, as shown in FIG. 7B. The control unit 4 acquires a midpoint between the first forward initial position P11G and the first forward terminal position P12G in the first direction D1 as a first forward midpoint position P1OG, and the control unit 4 acquires a midpoint between the first backward initial position P11B and the first backward terminal position P12B in the first direction D1 as a first backward midpoint position P1OB. The control unit 4 acquires a midpoint between the first forward midpoint position P1OG and the first backward midpoint position P1OB in the first direction D1 as the first midpoint position PIC. The intermediate position between the first forward initial position P11G and the first backward terminal position P12B coincides with the actual first initial position P11, and the intermediate position between the first forward terminal position P12G and the first backward initial position P11B coincides with the actual first terminal position P12, as shown in FIG. 7C. Similarly, in presence of a signal delay, the actual second midpoint position P2C can also be acquired in a way as mentioned the above.

The present invention perfectly solves the problem that calibration is difficult when a machine is installed conventionally. The conventional calibration method is time-consuming and labor-intensive and may not necessarily achieve high positioning accuracy. However, the position calibration system and method of the present invention allow the calibration to be automatically performed for compensation of a position deviation, an angle deviation and an error caused by a signal delay. Precisely calibrating and positioning individual devices or components in an apparatus can be easily carried out so that the complicated process for installation of an equipment is simplified while the labor hour and cost for installation of the equipment is greatly reduced.

The preferred embodiments of the present invention are illustrative only, and the claimed inventions are not limited to the details disclosed in the drawings and the specification. Accordingly, it is intended that it have the full scope permitted by the language of the following claims.

What is claimed is:

1. A position calibration method, comprising the steps of:
   (A) providing a positioner sensing module, a positioning substrate and a control unit, a circular positioner being provided on an upper surface of the positioning substrate, the positioner sensing module being electrically connected to the control unit;
   (B) controlling the positioner sensing module by using the control unit to scan the positioning substrate in a first direction, recording a first initial position and a first terminal position when an edge of the circular positioner is detected by the positioner sensing module and using the control unit to acquire a midpoint between the first initial position and the first terminal position in the first direction as a first midpoint position;
   (C) controlling the positioner sensing module by using the control unit to scan the positioning substrate in a second direction, recording a second initial position and a second terminal position generated by sensing the circular positioner when the edge of the circular positioner is detected by the positioner sensing module and using the control unit to acquire a midpoint between the second initial position and the second terminal position in the second direction as a second midpoint position;
   (D) using the control unit to acquire an intersected center position of an extension line from the first midpoint position in a direction perpendicular to the first direction and an extension line from the second midpoint position in a direction perpendicular to the second direction as a calibration reference point of the positioning substrate with respect to the positioner sensing module; and
   (E) performing automatic calibration of a position of the positioning substrate to compensate for position deviation, wherein the automatic calibration is based on the calibration reference point.

2. The position calibration method of claim 1, wherein in the step (B), the control unit controls the positioner sensing module to scan the positioning substrate forwardly and backwardly in the first direction at least once; a first forward initial position and a first forward terminal position are recorded when the edge of the circular positioner is detected by the positioner sensing module in a forward movement; a first backward initial position and a first backward terminal position are recorded when the edge of the circular positioner is detected by the positioner sensing module in a backward movement; the control unit acquires a midpoint between the first forward initial position and the first forward terminal position in the first direction as a first forward midpoint position and acquires a midpoint between the first backward initial position and the first backward terminal position in the first direction as a first backward midpoint position; and the control unit acquires a midpoint between the first forward midpoint position and the first backward midpoint position in the first direction as the first midpoint position.

3. The position calibration method of claim 1, after the step (D), the method further comprising a step (E) of using the control unit to control a height measuring unit to descend and to record a current height value when the height measuring unit touches the upper surface of the positioning substrate.

4. The position calibration method of claim 1, wherein a further circular positioner is provided on the upper surface of the positioning substrate; after the step (D), the steps (B), (C) and (D) are carried out on the positioning substrate, so as to acquire a further intersected center position of the further circular positioner; wherein the control unit calculates an included angle between a virtual line segment connecting the intersected center position and the further intersected center position and another virtual line segment extending in the first direction or the second direction as an offset angle.

5. The position calibration method of claim 4, wherein the offset angle is a smaller one of the included angle between the virtual line segment connecting the intersected center position and the further intersected center position and the another virtual line segment extending in the first direction and the included angle between the virtual line segment connecting the intersected center position and the further intersected center position and the another virtual line segment extending in the second direction.

6. A position calibration system, comprising:
   a positioning substrate, a circular positioner being provided on an upper surface of the positioning substrate;
   a positioner sensing module;
   a memory unit; and
   a control unit, electrically connected to the positioner sensing module and the memory unit;
   wherein the control unit controls the positioner sensing module to scan the circular positioner on the positioning substrate in a first direction and a second direction respectively so as to acquire an intersected center position of the circular positioner as a calibration reference point of the positioning substrate with respect to the positioner sensing module and stores the calibration reference point in the memory unit;
   wherein the control unit records a first initial position and a first terminal position upon detecting an edge of the circular positioner when the control unit controls the positioner sensing module to scan the circular positioner in the first direction; the control unit acquires a midpoint between the first initial position and the first terminal position in the first direction as a first midpoint position; the control unit records a second initial position and a second terminal position upon detecting the edge of the circular positioner when the control unit controls the positioner sensing module to scan the circular positioner in the second direction; the control unit acquires a midpoint between the second initial position and the second terminal position in the second direction as a second midpoint position; and the control unit acquires the intersected center position of an extension line from the first midpoint position in a direction perpendicular to the first direction and an extension line from the second midpoint position in a direction perpendicular to the second direction;

wherein the calibration reference point is used for calibration of a position of the positioning substrate and for automatic compensation of position deviation.

7. The position calibration system of claim 6, wherein the positioner sensing module comprises a robotic arm and a non-contact distance sensor unit mounted on the robotic arm; wherein the control unit controls the robotic arm to move in the first direction and the second direction, and the non-contact distance sensor unit scans the upper surface of the positioning substrate; wherein the control unit records positions as the first initial position and the second initial position upon detecting a sudden rise of a surface height and records positions as the first terminal position and the second terminal position upon detecting a sudden drop of the surface height.

8. The position calibration system of claim 7, further comprising a height measuring unit mounted on the robotic arm; wherein the control unit controls at least one of the robotic arm and the height measuring unit to descend and records a current height value when the height measuring unit touches the upper surface of the positioning substrate.

9. The position calibration system of claim 6, wherein a further circular positioner is provided on the upper surface of the positioning substrate; wherein the control unit controls the positioner sensing module to scan the further circular positioner on the positioning substrate in the first direction and the second direction respectively so as to acquire a further intersected center position of the further circular positioner; wherein the control unit finds out a smaller one of an included angle between a virtual line segment connecting the intersected center position and the further intersected center position and an another virtual line segment extending in the first direction and an included angle between the virtual line segment connecting the intersected center position and the further intersected center position and another virtual line segment extending in the second direction as an offset angle.

* * * * *